United States Patent [19]

Miles et al.

[11] Patent Number: 4,883,093
[45] Date of Patent: Nov. 28, 1989

[54] FLUID FLOW CONTROL DEVICE

[75] Inventors: Peter Miles, Crowthorne; Leslie A. D. Smith, Newbury, both of England

[73] Assignee: Hydro-Tec Limited, Berkshire, England

[21] Appl. No.: 137,981

[22] Filed: Dec. 28, 1987

[51] Int. Cl.⁴ .......................... F16K 15/14; G05D 7/01
[52] U.S. Cl. ........................................ 138/45; 137/517; 239/533.14
[58] Field of Search ................... 137/504, 517; 138/45, 138/46; 239/533.14

[56] References Cited

U.S. PATENT DOCUMENTS

| | | | |
|---|---|---|---|
| 2,454,929 | 11/1948 | Kempton . | |
| 2,568,519 | 9/1951 | Smith | 138/45 |
| 2,781,061 | 2/1957 | Frey | 137/517 X |
| 2,829,674 | 4/1958 | Segelhorst et al. | 137/504 X |
| 2,899,979 | 8/1959 | Dahl et al. | 138/45 |
| 2,936,788 | 5/1960 | Dahl et al. | 138/45 |
| 3,141,477 | 7/1964 | Campbell et al. | 138/45 |
| 3,409,050 | 11/1968 | Weese | 138/46 X |

FOREIGN PATENT DOCUMENTS

| | | |
|---|---|---|
| 0045668 | 8/1981 | European Pat. Off. . |
| 0230715 | 10/1986 | European Pat. Off. . |
| 2616566 | 10/1977 | Fed. Rep. of Germany ...... 137/517 |
| 2338437 | 8/1977 | France . |
| 84/03456 | 9/1984 | PCT Int'l Appl. . |
| 1032596 | 6/1566 | United Kingdom . |
| 804705 | 11/1958 | United Kingdom ................ 137/517 |
| 884608 | 12/1961 | United Kingdom . |
| 960495 | 6/1964 | United Kingdom . |
| 1110292 | 4/1968 | United Kingdom . |
| 1542849 | 6/1975 | United Kingdom . |
| 1601438 | 4/1978 | United Kingdom . |
| 2076941 | 5/1981 | United Kingdom . |

Primary Examiner—Stephen M. Hepperle
Attorney, Agent, or Firm—Armstrong, Nikaido, Marmelstein, Kubovcik & Murray

[57] ABSTRACT

A connector for high pressure fluid conduits, such as fire hoses, has a chamber (10) with an inlet (4) and outlet (6) and between them a resilient ring (18), having an outer diameter close to the width of the chamber, on a dished support (14). The ring has a generally rectangular section except for a chamfer (24) on the inner upstream edge. The support has a central flow passage (16) aligned with the central passage (20) in the ring and carries two intersecting trapezoidal fins (22) projecting through the ring. When connected to a complementary coupling, the inlet and outlet bores of the connector correspond to the diameter of the chamfered portion of the ring. The device controls transient pressure peaks by deformation of the resilient ring without excessive reduction in flow.

13 Claims, 1 Drawing Sheet

FLUID FLOW CONTROL DEVICE

This invention relates to a device for controlling fluid flow. The device finds particular application in controlling flow of liquids through tubes, such as pipes or hoses, in circumstances where the supply pressure is apt to vary.

One application of the invention is in controlling relatively high pressure and volume water flows through fire hoses. Typical supply pressures are from 7 to 16 bar, with flow rates of 450 to 750 liters per minute (100 to 130 gallons per minute). Abrupt pressure fluctuations can occur for various reasons. For example, the pump or hydrant supplying the water may be connected to several hoses, and in the event that one is shut off a transient pressure peak may occur in another hose, up to perhaps 20 to 25 bar. This can be a serious safety hazard to the fireman manning the hose.

It would be beneficial to provide means for responding rapidly to a pressure peak in a fluid supply line to restrict the flow of fluid through the line, thereby smoothing the fluid flow rate, without interrupting the supply altogether.

According to the present invention a device for controlling fluid flow comprises a chamber having an inlet and an outlet for the fluid and flow control means between the said inlet and outlet, the flow control means comprising a resilient member and a dished support therefor having aligned fluid flow passages therethrough, and the support including means projecting through the fluid flow passage in the resilient member for limiting the inward deformation of the said member.

Under fluid pressure, the resilient member is deformed into the dished support and reduces the effective aperture of the fluid flow passages in the flow control means. The combined effect of increased pressure and constricted aperture is to smooth out fluctuations in pressure and flow rate downstream of the device, and in particular to markedly reduce transmission of transient pressure peaks. It has been found that the deformation limiting means extends the range of pressures and flow rates over which the device can operate.

In order to most readily control the performance of the device, the fluid flows centrally through the flow control means. The chamber is suitably of circular cross-section and the resilient member is suitably annular in form, just fitting within the chamber with a small clearance from the chamber walls.

The resilient member may advantageously be figured differently on its upstream (inlet) and downstream (outlet) faces. The downstream face may be substantially flat, while the upstream face may include a flat outer surface and an inner surface that is inclined downwardly towards the central aperture. The fluid flow passage through the resilient member may be generally cylindrical, radiused at either end into the upstream and downstream faces of the ring.

Suitable materials for the resilient member may include natural and synthetic rubber and the like. Materials with a Shore hardness of from 50° to 60° may be particularly effective.

One embodiment of the invention is illustrated by way of example in the accompanying drawings, which show a connector for a fire hose incorporating a fluid flow control device constructed in accordance with the invention. In the drawings.

Figure 1:
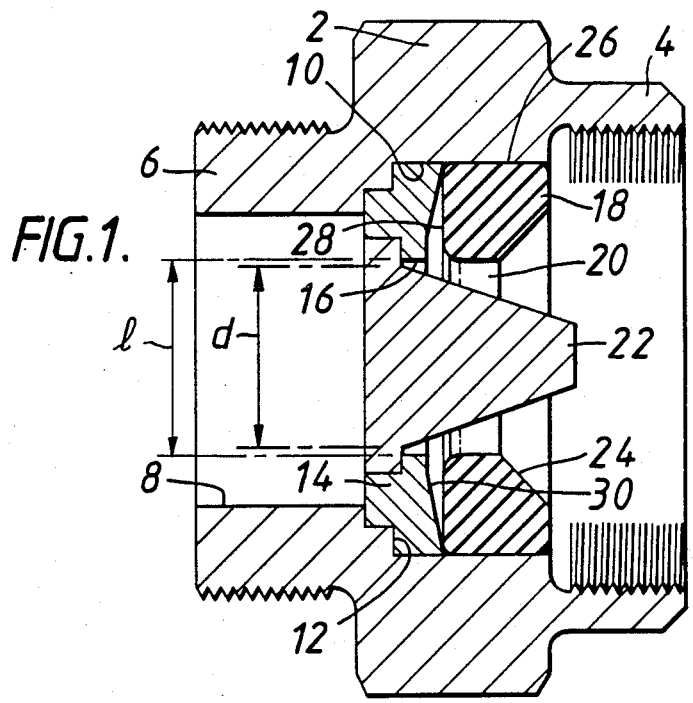
FIG. 1 is a longitudinal section through the connector.
Figure 2:
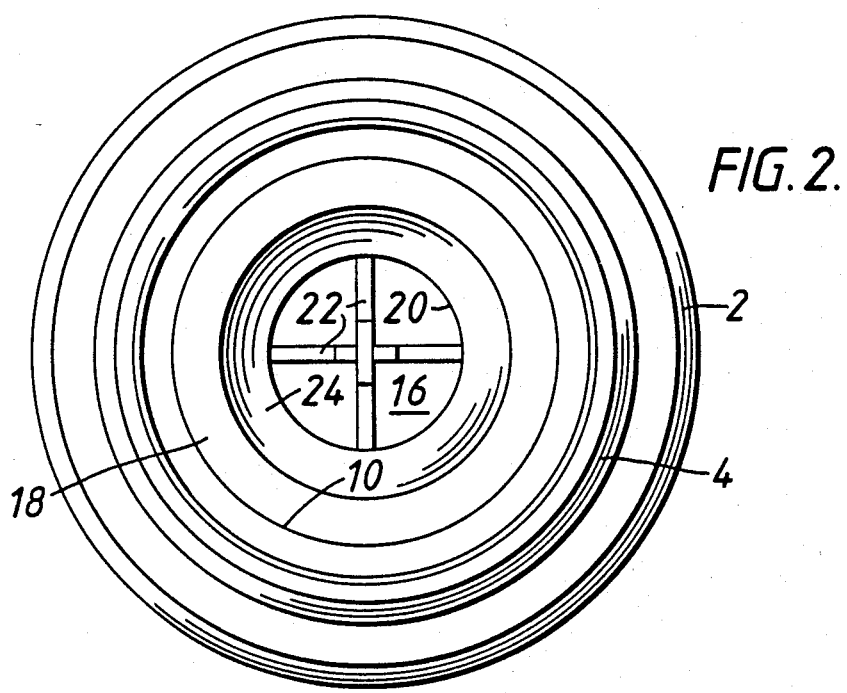
FIG. 2 is an elevation of the inlet end of the connector.

The connector comprises a casing 2 having a screw threaded female inlet end 4 and a screw threaded male outlet end 6. The inlet end is adapted to receive a male coupling similar to the male end 6 of the connector illustrated, so that the inlet and outlet bores of the connector are effectively the size of the bore 8 in the outlet end as shown.

Between the inlet and outlet ends lies a generally cylindrical chamber 10, having a step 12 of reduced diameter at the outlet end thereof. A dished support member 14 having a central circular fluid flow passage 16 therethrough is seated on the step 12 within the chamber. The member 14 supports a resilient ring 18 of elastomeric material which fits with clearance within the bore of the chamber 10 on the inlet side of the support. The elastomeric ring 18 has a central fluid flow passage 20 in alignment with the passage 16 through the support 14.

The support member 14 carries two intersecting trapezoidal fins 22 which project through the central passage 20 in the elastomeric ring 18. The fins limit the inward deformation of the elastomeric ring under high fluid pressures and flow rates.

The cross-section of the annular elastomeric ring 18 is essentially rectangular, modified by the provision of a chamfer 24 at the inner inlet side edge. Thus the outer face 26 of the ring is cylindrical, and in the relaxed state this outer face has a clearance of not more than about 0.5 mm from the chamber wall, to permit fluid to penetrate to the outer face of the ring but not to flow readily past the outer face or to displace the ring laterally to any significant extent.

The downstream or outlet face 28 of the elastomeric ring is substantially flat and meets the cylindrical outer face 26 with a small radius at 90°. This downstream face is supported by the support member 14 only at its outer rim, the support member being dished away from the elastomeric ring owing to a frusto-conical upstream surface 30 to the support member. This results in an annular gap between the support member and the ring which decreases from a maximum nearest the axis of the chamber 10 to zero at the wall of the chamber. This gap permits the ring to flex under pressure towards the support member, and in so doing the central flow passage 20 in the resilient elastomeric ring is reduced.

In its relaxed state the central flow passage 20 is substantially cylindrical, and the ratio between the diameter of the passage 20 and the outer diameter of the elastomeric ring 18 may suitably be from 1:1.2 to 1:1.3.

In order to properly distribute the fluid pressure over the upstream face of the resilient ring to cause the required deformation, the chamfered surface 24 may typically be formed at an angle of between 30° and 60°, suitably about 45°.

Under high fluid pressures and flow rates the inward deformation of the elastomeric ring 18 is limited by the four outer edges of the fins 22, which accordingly delay the ultimate collapse of the ring into the flow passage under excessive pressure. Suitably the ratio of the diameter 1 of the central flow passage 20 in the elastomeric member to the distance d across the fins measured where they start to project upstream is from 1:0.75 to 1:0.85, to allow a satisfactory inward deformation range.

In a fire hose delivering 450 to 750 liters of water per minute at a nominal pressure of 7 to 16 bar, but with transient pressure peaks reaching around 20 to 25 bar, it has been found that a flow control device similar to that illustrated in the drawings is able to control the transient peaks so that after transmission through the device the peaks are reduced to values in the region of two-thirds of their values at the inlet side of the device, for example to about 12 to 16 bar, without interrupting the water supply.

What is claimed is:

1. A device for controlling fluid flow comprising a chamber having an inlet and an outlet for the fluid and flow control means between the said inlet and outlet; the flow control means comprising a resilient member and a dished support therefor having aligned fluid flow passages therethrough; the said resilient member just fitting within the chamber with a small clearance from the chamber walls, and having a downstream face and an upstream face, the upstream face including a flat outer surface and a chamfered inner surface that is inclined downwardly towards the fluid flow passage in the resilient member; and the support including means projecting through the fluid flow passage in the resilient member with clearance therefrom in the relaxes state of the resilient member, for limiting the inward deformation of the said member without closing said fluid flow passage therethrough.

2. A device for controlling fluid flow comprising a chamber having an inlet and an outlet for the fluid and flow control means between the said inlet and outlet; the flow control means comprising a resilient member and a dished support therefor having aligned fluid flow passages therethrough; the said resilient member just fitting within the chamber with a small clearance from the chamber walls, and having a downstream face and an upstream face, the upstream face including a flat outer surface and a chamfered inner surface that is inclined downwardly towards the fluid flow passage in the resilient member; and the support including means projecting through the fluid flow passage in the resilient member with clearance therefrom in the relaxed state of the resilient member, for limiting the inward deformation of the said member without closing said fluid flow passage therethrough, said means projecting through said fluid flow passage in the resilient member for limiting the inward deformation of said member comprise fins carried by the support member.

3. A flow control device as claimed in claim 2 wherein the said fins are two intersecting trapezoidal fins.

4. A flow control device as claimed in claim 3 wherein the ratio of the width of the fluid flow passage in the resilient member to the distance d across the fins measured where they start to project upstream is from 1:0.75 to 1:0.85.

5. A flow control device as claimed in claim 2 wherein the chamber is of circular cross-section and the resilient member is annular in form, and the downstream face of the resilient member is substantially flat and in the relaxed state is supported by the support only at the outer rim of the said face.

6. A flow control device as claimed in claim 5 wherein the chamber wall has a step of reduced diameter at the outlet end thereof, and the dished support is seated on the step within the chamber.

7. A flow control device as claimed in claim 5 wherein the resilient member has a cylindrical outer surface which in the relaxed state has a clearance of not more than about 0.5 mm from the chamber wall.

8. A flow control device as claimed in claim 5 wherein the fluid flow passage in the resilient member is substantially cylindrical in the relaxed state, and the ratio between the diameter of the passage and the outer diameter of the resilient member is from 1:1.2 to 1:1.3.

9. A flow control device as claimed in claim 5 wherein the chamfered surface is formed at an angle of 30° and 60°.

10. A flow control device as claimed in claim 5 wherein the resilient member comprises an elastomeric material with a Shore hardness of from 50 to 60.

11. A device for controlling water flow at between about 450 and 750 liters per minute comprising a chamber of circular cross-section having an inlet and an outlet for the fluid and flow control means between the said inlet and outlet; the flow control means comprising an annular resilient member and a dished support therefor having aligned fluid flow passages therethrough; the said resilient member having a cylindrical outer face with a clearance of not more than about 0.5 mm from the chamber walls, having a substantially flat downstream face supported by the dished support only at its outer rim, and having an upstream face including a flat outer surface and a chamfered inner surface that is inclined downwardly towards the fluid flow passage in the resilient member; and the support including means projecting through the fluid flow passage in the resilient member with clearance therefrom in the relaxed state of the resilient member, for limiting the inward deformation of the said member at high water flow rates without closing the flow passage therethrough.

12. A device for controlling water flow at between about 450 and 750 liters per minute comprising a chamber of circular cross-section having an inlet and an outlet for the fluid and flow control means between the said inlet and outlet; the flow control means comprising an annular resilient member and a dished support therefor having aligned fluid flow passages therethrough; the said resilient member having a cylindrical outer face with a clearance of not more than about 0.5 mm from the chamber walls, having a substantially flat downstream face supported by the dished support only at its outer rim, and having an upstream face including a flat outer surface and a chamfered inner surface that is inclined downwardly towards the fluid flow passage in the resilient member; and the support including means projecting through the fluid flow passage in the resilient member with clearance therefrom in the relaxed state of the resilient member, for limiting the inward deformation of the said member at high water flow rates without closing the flow passage therethrough said means projecting through the fluid flow passage in the resilient member for limiting the inward deformation of the said member comprises intersecting trapezoidal fins carried by the support member.

13. A connector for a fire hose incorporating a fluid flow control device as claimed in claim 12 within a casing having a female end and a male end each provided with a bore communicating with said inlet and outlet of the chamber, the female end being adapted to receive a male coupling similar to the male end of the device so that, when so coupled, the inlet and outlet bores of the device are effectively of equal diameters corresponding to the outer diameter of the chamber on the resilient member.

* * * * *

UNITED STATES PATENT AND TRADEMARK OFFICE
CERTIFICATE OF CORRECTION

PATENT NO.   :   4,883,093
DATED        :   November 28, 1989
INVENTOR(S)  :   MILES et al It is certified that error appears in the above-identified patent and that said Letters Patent is hereby corrected as shown below:

On the cover page, after Item [22] insert
--[30]       Foreign Application Priority Data
    Dec. 29, 1987 [UK]   United Kingdom........8630945--.

Column 2, lines 63 and 64, "diameter 1" should read
    --diameter $\ell$--.

Signed and Sealed this

Eighteenth Day of December, 1990

Attest:

HARRY F. MANBECK, JR.

Attesting Officer

Commissioner of Patents and Trademarks